METHOD OF FABRICATING A P-N JUNCTION

Filed May 27, 1954 4 Sheets-Sheet 1

INVENTOR
C. S. FULLER
BY John C. Morris
ATTORNEY

INVENTOR
C. S. FULLER
BY John C Morris
ATTORNEY

INVENTOR
C. S. FULLER
BY John C. Morris
ATTORNEY

INVENTOR
C. S. FULLER
BY John C. Morris
ATTORNEY

United States Patent Office 2,819,191

Patented Jan. 7, 1958

2,819,191

METHOD OF FABRICATING A P-N JUNCTION

Calvin S. Fuller, Chatham, N. J., assignor to Bell Telephone Laboratories, Incorporated, New York, N. Y., a corporation of New York Application May 27, 1954, Serial No. 432,638

3 Claims. (Cl. 148—1.5)

This invention relates to the fabrication of semiconductors for signal translating devices and more particularly to methods for producing silicon bodies having p-n junctions therein.

Silicon bodies having two or more contiguous portions of opposite conductivity types and defining p-n junctions find application in a variety of signal translating devices, for example, such as disclosed in Patent 2,569,347, granted September 25, 1951, to W. Shockley.

Semiconductive material, as is extensively discussed in the foregoing patent to Shockley, may be of either of two distinct or opposite conductivity types designated p and n, the p material exhibiting low resistance to current flow to a metallic connection thereto when it is positive relative to the connection and the n material exhibiting such low resistance when it is negative with respect to the connection. As is also known, the conductivity type may be determined by the relative amounts of acceptor and donor atoms in the material, p-type conductivity being associated with an excess of acceptors and n-type conductivity being associated with an excess of donors.

This invention involves the discovery that upon heating a body of p-type conductivity silicon within a restricted temperature range significant changes occur in the resistivity of the material, specifically the material tends to decrease in p-type conductivity and approaches and converts to n-type. If the heat treatment is conducted within a critical temperature range for a prescribed period of time a p-type silicon body of greater than about 0.5 ohm-centimeter conductivity converts entirely to n-type conductivity.

Material so converted to n-type has been found to have unusual photoelectric properties, lending itself to the fabrication of certain useful devices as disclosed in the application of J. R. Haynes and J. A. Hornbeck, Serial No. 432,842, filed concurrently with this application.

This invention involves the further discovery that certain silicon material which is hereinafter referred to as "stable" silicon is susceptible to this heat treatment only in a slight degree. Specifically, stable silicon does not undergo a change of conductivity type from p to n when heated within the above-referred to critical temperature range. However, as will be developed more fully hereinafter, "stable" silicon can be made amenable to this conversion treatment.

One type of stable silicon is disclosed in the application of N. B. Hannay, Serial No. 432,792, filed concurrently with this application, now Patent No. 2,743,200. It is indicated therein that monocrystalline silicon grown in accordance with the technique disclosed in the application of J. B. Little and G. K. Teal, Serial No. 138,354, filed January 13, 1950, and now Patent 2,683,676, issued July 13, 1954, but without the usual agitation or stirring of the melt by rotation of the crystal or otherwise, is apparently not susceptible to conversion from p- to n-type conductivity under heat treatment.

A further type of stable silicon is disclosed hereinafter as being silicon material which has been stabilized by a two-step heat treatment process.

It has been found that by following a special preparatory procedure stable p-type material may be rendered susceptible to the heat treatment and conductivity alteration of this invention. In accordance with this procedure a portion of a stable silicon body is fused in air at a temperature of about 1500° C. and cooled rapidly. If the silicon body is then heat treated within the prescribed temperature range essentially only that portion previously fused is converted to n-type conductivity, the balance of the material remaining p-type.

It has been found further that p-type conductivity material which has been converted to n-type by heating within the critical temperature range as described heretofore may be reconverted to its original condition of conductivity, namely p-type, by heating at an elevated temperature somewhat above the critical range employed for conversion to n-type and for a comparatively short time. Thus, one method of forming p-n junctions in accordance with this invention is by reconverting only a portion of a converted n-type silicon body, thereby producing contiguous p- and n-type regions in a single body.

Following such reconversion, heat treatment within the critical lower temperature range will again convert the major portion of the silicon body to n-type conductivity. The technique thus disclosed therefore constitutes a reversible effect as between conductivity types. However, if the heat treatment at an elevated temperature to reconvert the material to p-type is prolonged, subsequent conductivity change by heating is substantially inhibited. This technique thus constitutes a method of rendering p-type conductivity silicon stable to further heat treatment.

It is therefore one object of this invention to produce silicon bodies having p-n junctions therein. It is also an object to convert major portions of initially p-type conductivity silicon bodies to n-type conductivity.

In still another aspect, an object of this invention is to produce temperature-insensitive or stable p-type silicon material.

One specific method in accordance with this invention involves heating a normally grown crystal of p-type conductivity silicon at a temperature between 350° C. and 500° C. for a period of from one to forty-eight hours depending upon the magnitude of the resistivity. The crystal will then be found to be composed almost entirely of n-type conductivity material except for a discontinuous outer "skin" or layer which may range from five to 125 mils in thickness which remains p-type. If the crystal is then heated at between 900° C. and 1300° C. for approximately one minute it will reconvert to become entirely p-type conductivity material. If the reconversion treatment is continued for a longer period of from 15 to 48 hours, subsequent conversion to n-type conductivity by heating in the 350° C. to 500° C. range is substantially inhibited.

In another specific embodiment a body of converted n-type silicon is subjected to a localized heating at 1000° C. for a period of about 30 seconds. After cooling the region thus heated at 1000° C. is of p-type conductivity while the balance of the body remains n-type.

In a further specific embodiment a stable silicon crystal of p-type conductivity is subjected to a localized heating in air so as to fuse a small region at a temperature of about 1500° C. The body is then cooled by radiation to less than a red heat in about one minute. The body is then reheated and held at a temperature of about 450° C. for from one to forty-eight hours.

Following a final air cooling, the silicon body has a region of n-type conductivity material corresponding to the portion which was previously fused while the remainder of the body is of p-type material. Thus, p-n junctions having desirable characteristics for use in electrical translating devices may be advantageously produced.

These and other features and objects of this invention will be understood more clearly and fully from the following detailed description taken in connection with the drawing, in which Fig. 1 indicates in diagrammatic form the steps in effecting the conductivity-type conversion of a silicon body and the production of p-n junctions therein;

Fig. 2 shows in similar diagrammatic form the steps in rendering a body of p-type silicon stable to heat treatment;

Fig. 3 indicates also diagrammatically the steps in a further method of forming a p-n junction in accordance with this invention;

Figure 6:
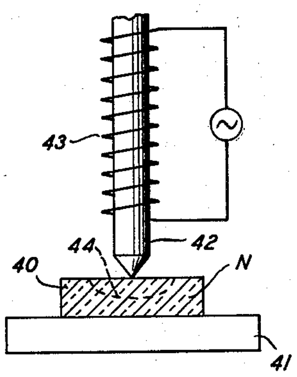
Figure 7:
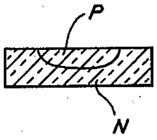
Figure 8:
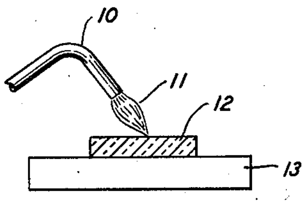
Figure 9:
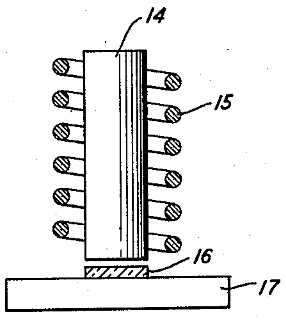
Figure 10:
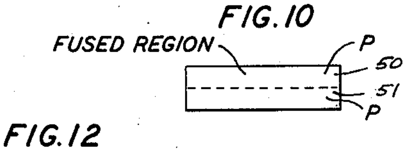
Figure 11:
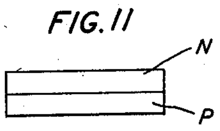
Figure 12:
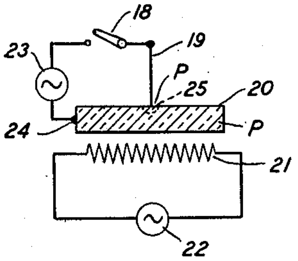
Figure 13:
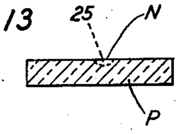
Figure 14:
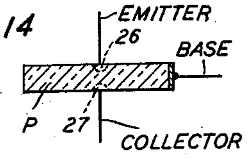
Figure 15:
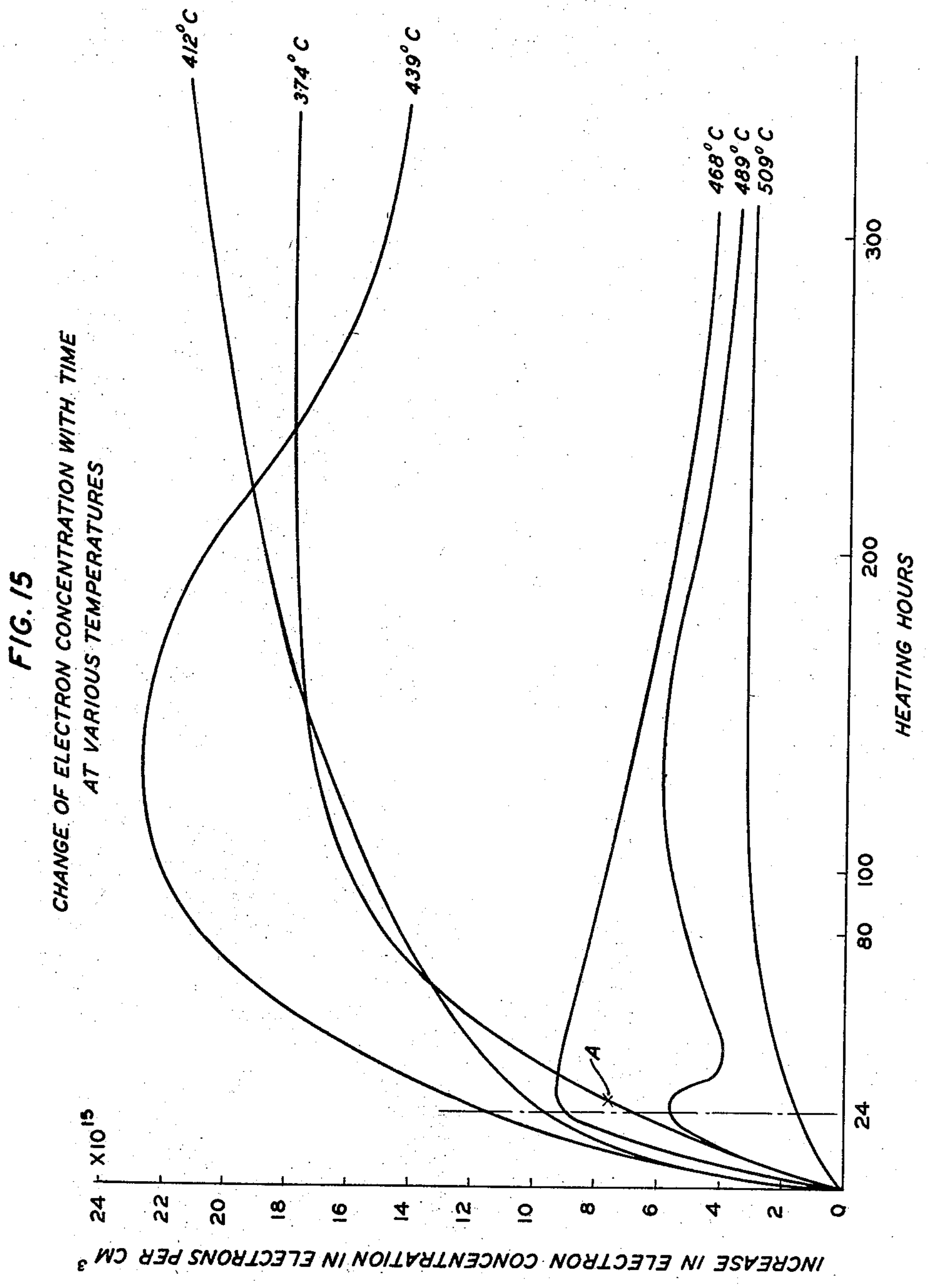
Figure 16:
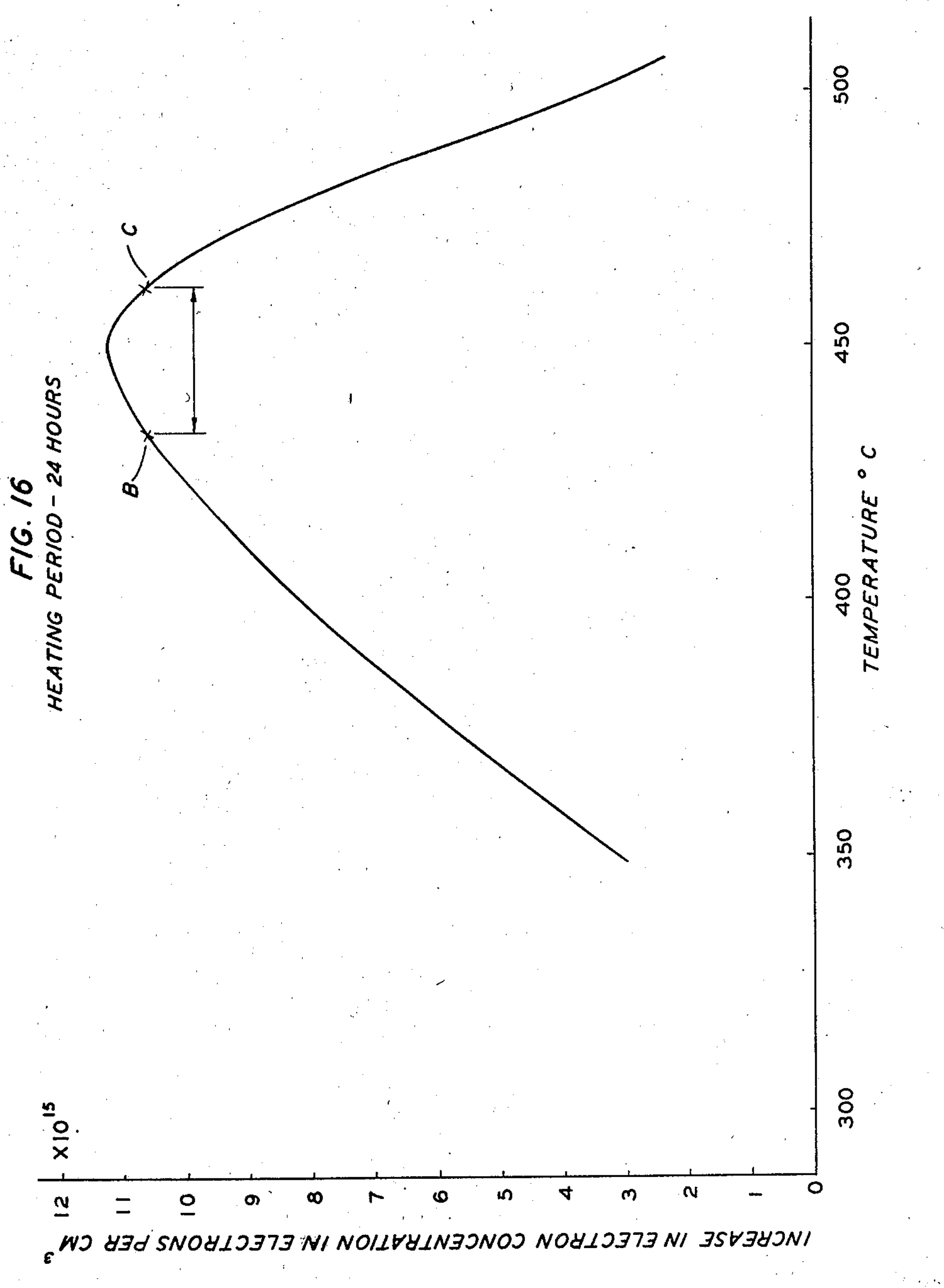

Fig. 6 indicates partially schematically and in section a technique for the production of a p-n junction;

Fig. 7 is a section of a silicon wafer containing a p-n junction produced by the method of Fig. 6;

Fig. 8 indicates schematically a simple arrangement for carrying out the initial fusion step in the production of a p-n junction in accordance with this invention;

Fig. 9 is a schematic perspective of a further arrangement for accomplishing the initial fusion step in the production of a large area p-n junction;

Figs. 10 and 11 are side elevations of the silicon body treated in the apparatus of Fig. 9 before and after the heat treatment for effecting conductivity conversion;

Figs. 12, 13, and 14 indicate partially schematically and in section a further technique for production of small p-n junctions in a diode and in a transistor;

Fig. 15 is a graph indicating the change in conductivity with time of a p-type silicon body at various temperatures; and Fig. 16 is a graph indicating the change in conductivity with temperature for a given period of time.

Figure 1:
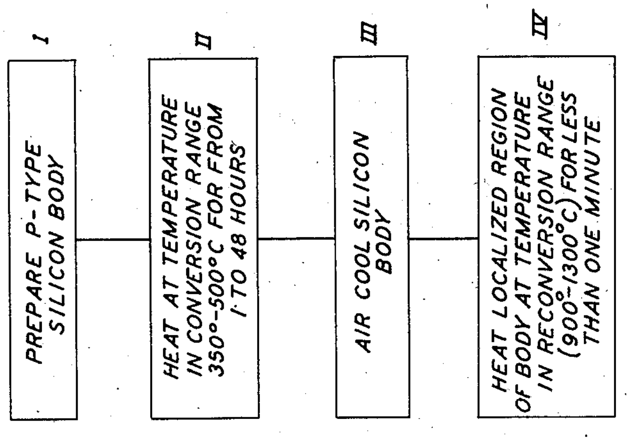
Figure 4:
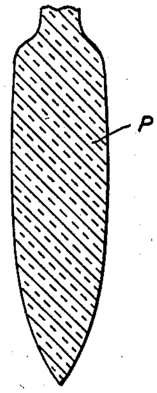
Fig. 4 shows in longitudinal section a grown crystal of silicon prior to the heat treatment in accordance with this invention.

Turning to Fig. 1, the first block of the flow diagram indicates the initial step comprising the preparation of a body of p-type conductivity silicon. For example, a crystal of p-type silicon grown in accordance with the method disclosed in the aforementioned application of J. B. Little and G. K. Teal is sectioned longitudinally. The exposed plane surface of such a crystal will appear as depicted in Fig. 4. The crystal may be identified as being entirely of one conductivity type upon treatment in accordance with the disclosure of Patent 2,669,692, granted February 16, 1954, to G. L. Pearson, wherein there is shown a method for the visual determination of p-n junctions.

Figure 5:
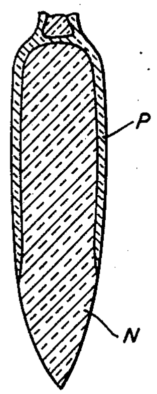
Fig. 5 is the same view of the crystal following heat treatment.

As indicated in block II of Fig. 1, the silicon body is then heated in a suitable furnace under ordinary atmospheric conditions at a temperature within the range from 350° C. to 500° C., after which the silicon material is withdrawn and, as indicated in block III, allowed to cool in air at room temperature or while in contact with a radiating surface such as, for example, a marble bench top. If the crystal portion is again subjected to the identifying treatment disclosed in the above-identified patent to Pearson, the longitudinal section will appear generally as shown in Fig. 5. It will be observed that the major portion of the body has undergone a change of conductivity type and that only a relatively thin discontinuous layer of p-type material remains on the outside.

Although heating within the above-mentioned range of from 350° C. to 500° C. will effect this conductivity-type conversion, the most advantageous heating temperature for 24 hour heat treatment has been found within about ten degrees above or below 450° C. The length of time during which the body is heated may extend for from one hour to forty-eight hours or more generally depending upon the specific temperature of heating and the amount of conductivity change desired.

Referring to Fig. 15, the effect of heating at various temperatures within the conversion range is illustrated. The curves shown represent the conductivity change in terms of increase in electron concentration plotted against the heating time for six different temperatures within the conversion range of 350° C. to 500° C. It is to be noted that the curves depicted are for a particular portion or body of silicon taken generally from the upper central region of a grown crystal. However, these curves are representative of the general form exhibited by all silicon material which exhibits the conductivity change phenomena herein disclosed. Generally, for different lots of material the family of curves will shift upward or downward from those depicted in Fig. 15.

Thus, for example, a specimen of n-type silicon having a resistivity of 1.0 ohm-centimeter equivalent to an electron concentration of $6.5\times10^{15}$ cm.$^{-3}$ may be changed to 0.5 ohm-centimeter resistivity equivalent to an electron concentration of $14.0\times10^{15}$ cm.$^{-3}$ by heating at 374° C. for about 26 hours. This corresponds to an increase of $7.5\times10^{15}$ electrons/cm.$^3$ indicated by the point A on the 374° C. temperature curve of Fig. 15.

The most effective heating range for a given heating period is indicated by the graph of Fig. 16 which depicts the conductivity change produced at various temperatures in the conversion range. This curve is a plot of increase in electron concentration against temperature of heat treatment for a fixed heating time of 24 hours and is taken from the points of intersection on Fig. 15 of the vertical line indicative of the 24 hour heating period with each of the individual temperature curves. It will be observed that the peak region from B to C representing the range from 434° C. to 463° C. produces the maximum effect for 24 hours heating time.

It has been observed generally, that while heating silicon in the range from 350° C. to 500° C. effects an increase in electron concentration, an alteration in the conductivity type apparently does not occur on p-type silicon of less than about 0.5 ohm-centimeter conductivity.

Block IV of Fig. 1 indicates a further step whereby a discrete portion of a converted n-type silicon body can be reconverted to p-type by a short period of localized heating at a temperature in the range from 900° C. to 1300° C. For example, as shown in Fig. 6 a wafer 40 of silicon prepared from the central portion of the crystal of Fig. 5 and thus of n-type conductivity is mounted on a block 41 of insulating material such as graphite. A needle 42, for example of tungsten or graphite, is heated to a temperature of about 1000° C. as by the high resistance winding 43 having an alternating current applied thereto. The point is then brought into contact with the surface of the wafer in air for a short period, say 30 seconds, and withdrawn. It has been found that the presence of water vapor in the surrounding atmosphere has some beneficial effect. During this interval, heat diffuses from the point into the adjacent silicon material as indicated by the dotted outline 44, raising its temperature to within the reconversion range. The resulting structure as shown in section in Fig. 7, will be a p-n junction diode in which the p zone generally coincides with the heated region 44. It will be understood, of course, that if the entire wafer is heated to the 900° C. to 1300° C. range, reconversion of the entire body to p-type conductivity occurs.

Figure 3:
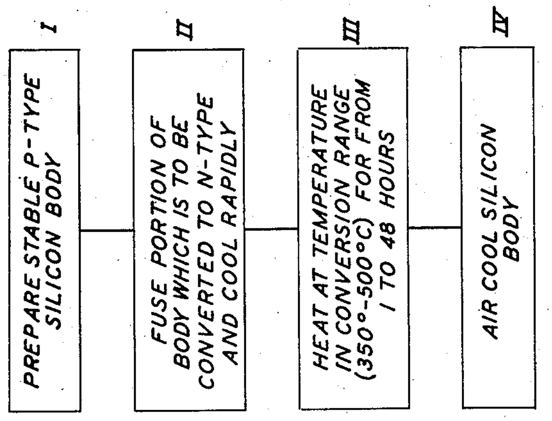
Figure 2:
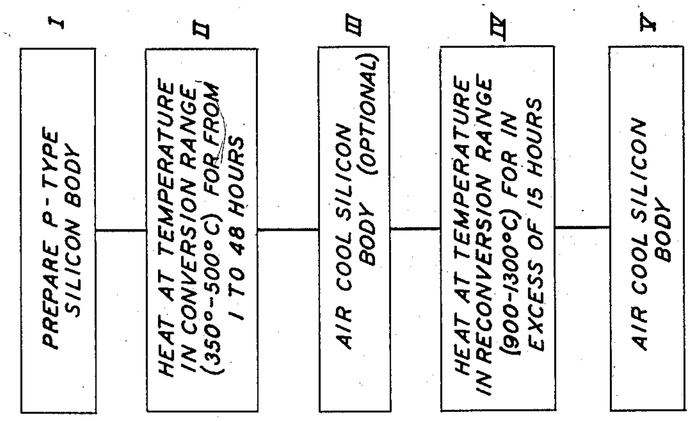

The flow diagram of Fig. 2 represents a variation of the technique set forth above. The steps indicated by blocks I and II and III are similar to those described in connection with Fig. 1. The cooling step need not be carried out. Following the initial heat treatment during which the major portion of the body has been converted to n-type conductivity material, as mentioned hereinbefore, a further heat treatment at a temperature in the range from 900° C. to 1300° C. will effect a reconversion of the entire body to p-type conductivity. This transformation occurs in a relatively short time of the order of one minute or less. If, following a short heating period of this nature, the silicon material is again heated at a lower temperature in the 350° C. to 500° C. range, conversion to n-type will again take place as before. As indicated by block IV of Fig. 2, however, the heating in the higher reconversion temperature range is continued for a period in excess of about 15 hours.

After cooling, the p-type conductivity body is found to be resistant to further conductivity-type changes when subjected to heat treatments. Material so temperature stabilized may be used advantageously in processes for the production of signal translating devices. For example, p-type silicon stabilized in this manner may find application in the diffusion techniques disclosed in applicant's copending applications Serial No. 320,359, filed November 14, 1952, now Patent No. 2,725,315, Serial No. 355,-707, filed May 18, 1953, now Patent No. 2,725,316, and Serial No. 414,272, filed March 5, 1954.

In one specific example of the technique hereinbefore described a p-type crystal of silicon grown by the rod pulling technique with stirring was sectioned longitudinally so as to appear similar to Fig. 4. This material had a resistivity of 25 ohm-centimeters p-type. After heating at 460° C. for a period of 40 hours the body was removed from the furnace and allowed to cool to room temperature. Treatment in accordance with the aforementioned disclosure of G. L. Pearson caused an appearance similar to the crystal section of Fig. 5. In this instance the layer of remaining p-type material in the region of maximum crystal diameter ranged from 27 to 30 mils in thickness. The resistivity of the inner n-type region was found to range from 0.2 ohm-centimeter at the top of the crystal to 1.0 ohm-centimeter at the bottom.

This silicon crystal portion was then placed in a furnace at 950° C. for a period of 15 minutes following which it was cooled by radiation in air at room temperature. Upon examination the entire body was found to be of p-type conductivity and exhibited resistivities of the order of 25 ohm-centimeters. The crystal section was again placed in the furnace at 460° C. and maintained at this temperature for about 40 hours. After cooling the silicon material was again examined as in the case of the initial heat treatment and exhibited an appearance similar to that of Fig. 5 after treatment in a barium titanate suspension in accordance with the teachings of the above-identified patent to Pearson. The inner n-type portion of the crystal exhibited resistivities in the same range as before from 0.2 ohm-centimeter to 1.0 omb-centimeter.

A transverse slice of this same crystal portion 40 mils thick was placed in the furnace at 1100° C. and maintained for about 64 hours. After cooling, the material was of entirely p-type conductivity exhibiting a resistivity of about 25 ohm-centimeters. Attempts to convert this p-type material were then conducted by heating for extended periods at 460° C. However, only a slight change in resistivity from 25 ohm-centimeters to about 28 ohm-centimeters was detectable with no alteration in conductivity type, thus indicating a substantially stable electrical characteristic.

Turning now to Figs. 8 through 14, techniques are disclosed for the production of p-n junctions. These techniques utilize stable p-type silicon which does not convert to n-type conductivity when heated in the conversion range.

Fig. 8 depicts a silicon wafer 12 in section mounted on a suitable insulating block 13, for example, of graphite. An oxy-hydrogen flame 11 from a torch 10 is applied to the top surface of the wafer until a considerable portion has reached the molten state at a temperature of about 1500° C. The flame is then removed and the molten region cooled to below red heat in less than one minute.

An alternative electrical means for fusing a portion of a similar wafer 16 likewise on an insulator 17 is shown in Fig. 9 utilizing a high frequency heating coil 15 surrounding a heat concentrating member such as a graphite rod 14. It has been found that the best results are obtainable when the fusing and solidifying step is carried out in air.

Following this initial preparatory step the silicon wafer consists of a section 50 which has been completely fused and resolidified and another section 51 which has not so fused and resolidified as represented in Fig. 10. This wafer is then heated at a temperature in the conversion range as previously set forth and cooled to room temperature. Examination discloses that the unfused region remains p-type while the region which has been fused and resolidified is converted to n-type conductivity. The area of contiguity of the two regions defines a p-n junction. Generally, the technique described in connection with Figs. 8 through 11 is advantageously employed to produce junctions of relatively large area.

Fig. 12 discloses a schematic arrangement for producing small area p-n junctions. A silicon wafer is placed on a heater 21 indicated diagrammatically and raised to a temperature of about 300° C. A pointed electrode 19 of suitable material, for example tungsten, is placed in contact with the wafer and a pulse of about three amperes from the alternating-current source is passed through the point. With the circuit completed to the wafer by means of the ohmic connection 24, a small region 25 immediately under the point fuses and resolidifies rapidly. The wafer is then heat treated in the conversion range to effect conversion of the small fused region 25 to n-type, while the remainder of the wafer remains p-type. The structure resulting therefrom is indicated in section in Fig. 13 and is especially suitable for use as a small area diode. Other useful structures may be achieved by applying the pointed electrode to one or more other locations on the silicon wafer surface to accomplish fusion and refreezing of additional and separate small regions. For example, Fig. 14 depicts a structure suitable for use as a transistor by forming small fused and solidified regions 26 and 27 on opposite sides of the wafer to which emitter and collector connections may be made. Other suitable electrode materials which minimize the possibility of introducing significant chemical impurities include quartz and silicon itself.

In one example in accordance with the techniques thus described, a "stable" p-type conductivity silicon crystal was grown without rotation and exhibited a resistivity of 50 ohm-centimeters. A bar 0.3 x 1.0 x 2.0 centimeters taken from this crystal was fused over half of its length by heating in a quartz tube in a flow of oxygen and allowed to solidify by radiation cooling. It was then heat treated at 450° C. in air for 16 hours. Examination showed the fused and solidified portion to be low resistivity n-type material whereas the unfused portion of the bar remained p-type. The bar was etched for 30 seconds in mixed nitric and hydrofluoric acids and contacts were made to abraded areas of the n and p regions by means of silver paste. The following characteristics were observed:

| Voltage | Milliamperes Forward Current | Milliamperes Reverse Current |
|---|---|---|
| 1 | 3.0 | <0.010 |
| 6 | 11.0 | <0.010 |
| 10 | 30.0 | <0.010 |

In another example, a wafer of single crystal p-type silicon 40 mils thick was taken from a crystal grown by the rod pulling technique and with rotation of the crystal during growth thus classifying the material as generally susceptible to conductivity change under heat treatment.

This wafer was then rendered "stable" by heating first at 460° C. for 24 hours, followed by heating at 1000° C. for 24 hours. The wafer of p-type silicon was then heated again at 450° C. without undergoing any significant change in conductivity, thereby indicating its stability.

Approximately one-third of the wafer was then fused, using an oxy-hydrogen flame, and allowed to resolidify, which occurred in about 10 seconds. The conductivity of the fused portion was determined at this juncture to be about 8000 ohm-centimeters n-type or nearly intrinsic.

After heating at 450° C. for one hour the conductivity had become 0.8 ohm-centimeter n-type and after 68 hours the previously fused region had become 0.3 ohm-centimeter n-type, while the remainder of the wafer remained p-type.

In a further example, a portion of a nonrotated, i. e. stable, single crystal was found to have a resistivity of 15 ohm-centimeters p-type. The body was placed on a tantalum strip heater which also served as contact to one terminal of a low voltage transformer. By means of the heater the silicon was raised to about 300° C. A pointed 25 mil tungsten wire was connected to the second terminal of the transformer. By means of a key a momentary current of five amperes was passed through the point causing the silicon immediately under it to fuse. This operation which was done in air was repeated at other positions on the specimen. The silicon body was then given a heat treatment at 470° C. for 20 hours and cooled. Contact was established to the base of p-type region of the silicon and by means of a tungsten point successively to the small fused regions. N-type rectifier performance was observed as indicated by the following representative values:

| | |
|---|---|
| Forward current at 6 volts _____ milliamperes __ | 10 |
| Reverse current 0 to −30 volts ________ do ____ | <0.001 |
| Reverse peak ______________________ volts __ | >−100 |

By contrast a tungsten point placed on the adjacent silicon which had not been fused and refrozen exhibited a forward current of one milliampere at seven volts and poor reverse characteristic with a gradual breakdown beginning at about −15 volts.

What is claimed is:

1. The method of producing a body of stable p-type silicon which comprises heating said body at a temperature between 350° C. and 500° C. for from one to forty-eight hours, then heating said body at a temperature between 900° C. and 1300° C. for a period in excess of 15 hours, and cooling said body.

2. The method of fabricating a p-n junction which comprises fusing a discrete portion of a body of stable silicon produced by the rod pulling technique without stirring, said body having a p-type conductivity greater than about 0.5 ohm-centimeter, cooling said discrete portion rapidly, heating said body at a temperature between 350° C. and 500° C. for a period of from one to forty-eight hours, thereby to convert said discrete portion of said body to n-type conductivity, and cooling said body.

3. The method of fabricating a p-n junction which comprises a discrete portion of a silicon body stabilized in accordance with the method of claim 1, cooling said fused portion rapidly, heating said body at a temperature between 350° C. and 500° C. for a period of from one to forty-eight hours, thereby to convert said discrete portion of said body to n-type conductivity, and cooling said body.

References Cited in the file of this patent

UNITED STATES PATENTS

| | | |
|---|---|---|
| 2,603,692 | Scaff ________________ | July 15, 1952 |
| 2,629,672 | Sparks _______________ | Feb. 24, 1953 |
| 2,692,839 | Christensen ___________ | Oct. 6, 1954 |

OTHER REFERENCES

Physical Review, Aug. 1, 1952, vol. 87, pages 527–528.